324-67 SEARCH ROOM

June 21, 1966 E. C. CHANNELL 3,257,613

SPECTRUM ANALYZER INCLUDING PROGRAMMED SWITCHING MEANS

Filed Oct. 2, 1962

INVENTOR.
EARL C. CHANNELL
BY Arthur H. Swanson
ATTORNEY.

3,257,613
SPECTRUM ANALYZER INCLUDING PROGRAMMED SWITCHING MEANS

Earl C. Channell, Littleton, Colo., assignor to Honeywell Inc., a corporation of Delaware Filed Oct. 2, 1962, Ser. No. 227,932
5 Claims. (Cl. 324—77)

This invention relates to frequency analyzers. More specifically, the present invention relates to frequency analyzers having an automatic output signal gain adjustment.

An object of the present invention is to provide an improved frequency analyzer having an automatic output signal gain adjustment.

Another object of the present invention is to provide an improved frequency analyzer having an automatic gain adjustment to maintain an analyzer output signal within a predetermined range.

A further object of the present invention is to provide an improved frequency analyzer, as set forth herein, having a simplified operation and construction.

In accomplishing these and other objects, there is provided, in accordance with the present invention, a frequency analyzer having means for separating frequency components of a mixed frequency input signal. The separated frequency components are individually and separately applied to frequency sensitive filter devices arranged as a pair of filter devices. The pair of filters is arranged to pass a pair of adjacent frequency component signals. One of these frequency signals is applied to a gain sensing circuit used to control the gain of a variable signal attenuating device. The operation of the gain sensor is used to control the variable attenuator whereby a fixed amplitude range of the output signals from the attenuator is maintained. After an attenuator is adjusted to provide a suitable gain level, the applied frequency signal is removed from the gain sensor and is applied to the preset attenuator for amplification thereby. Simultaneously, the next frequency signal to be analyzed is applied to the gain sensing circuit to effect a preadjustment of another signal attenuator. The signal attenuators are sequentially switched by a switching network to the system functions of gain presetting and signal amplification and readout of the amplified signal.

A better understanding of the present invention may be had from the following detailed disclosure when read in connection with the accompanying drawings, in which.

Figure 1:
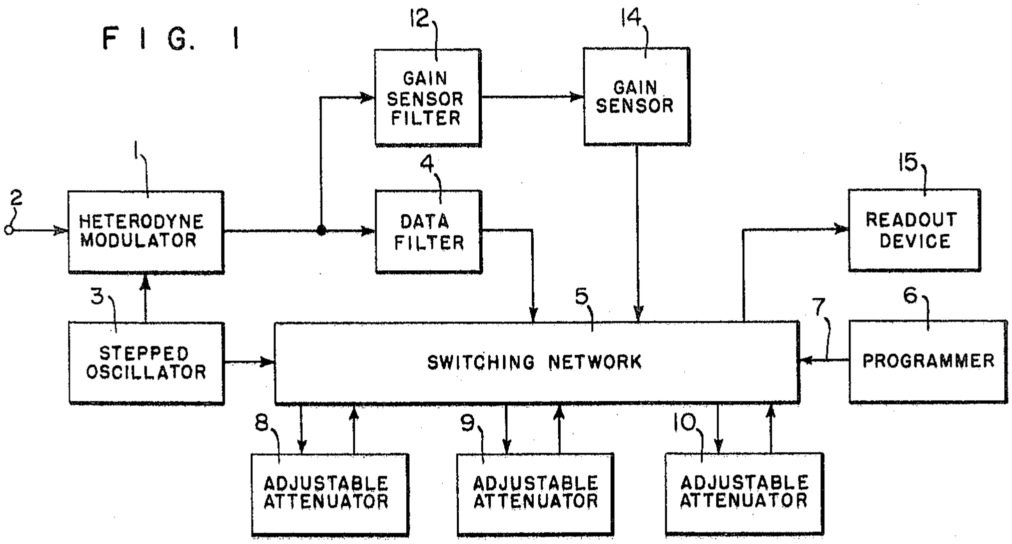
FIG. 1 is a block diagram of a frequency analyzer embodying the present invention.

Referring to FIG. 1 in more detail, there is shown a frequency analyzer embodying the present invention and comprising a heterodyne modulator circuit 1. A variable frequency input signal to be analyzed is applied to an input terminal 2. The input signal may be a data signal comprising a composite variable frequency signal composed of a plurality of different frequency signals each having distinct amplitudes. In analyzing a composite signal of this type, it is desirable to separate the individual frequency signals composing the composite signal and to measure their individual amplitudes. The output signal from such an analysis is a succession of signals, each corresponding to a different frequency and having an amplitude representative of the amplitude of the corresponding frequency in the composite. This output signal may be applied to a recording means to provide a record of the frequency makeup of the composite signal. Since, the amplitudes of the different frequencies may extend over a wide amplitude range, it is desirable to provide a limited range of variation in the amplitudes of the analyzer output signals supplied to the recording device. If this is not provided, the recording device (which contains an R.M.S. analog computer with limited range capability) will be unable to record the largest and smallest amplitudes with the same degree of readability on a common recording medium. Accordingly, the input signal applied to terminal 2 is separated into its frequency elements and the amplitude of each frequency element is limited to a predetermined range by the operation of the present invention.

In order to separate the composite signal into its component frequencies, a stepped oscillator 3 is used to provide a succession of different frequency signals. Each of these frequency signals is mixed with the input signal in the modulator 1. This frequency mixing, or heterodyning, is effective to produce sum and difference output signals representative of the combination of each of the oscillator signals with the assorted frequencies of the input signal. While many output signals are, thus, produced by the modulator 1, a desired one of the input signal frequencies is effective to produce an individual frequency signal which may be separated from the other modulator output signals. A highly selective data frequency filter 4 is used to separate the desired data frequency signal from the other frequency signals. The separated data frequency is applied to a switching network 5 for selective distribution. The switching network 5 may be a relay matrix having relay coils sequentially and selectively energized by a programmer 6. For example, suitable switching networks for use as network 5 are shown in Patent Nos. 3,034,051, 3,064,247, and 3,072,846. Specifically, Patent Nos. 3,064,247 and 3,072,846 show relay groups having individual relays sequentially operated by a sequencing, or programming device. Patent No. 3,034,051 shows a cross-bar switch device used to interconnect input and output lines such as the Cunningham Type F Crossbar Switch manufactured by James Cunningham, Son & Co., Inc., Rochester, New York. Other suitable devices may occur to those skilled in the art without departing from the scope of the present invention. The programmer 6 may be any suitable device for sequentially applying a relay coil energizing signal along a selected one of a plurality of output lines 7; e.g., an automatic stepping switch.

The switching network 5 is used to provide the means for interconnecting the selected frequency of the data filter 4 with a suitable one of three adjustable signal attenuators 8, 9, and 10. Further, the switching network 5 is effective to provide a control signal to step the oscillator 3 to provide a sequence of different oscillator frequency signals to heterodyne with the composite input signal in the modulator 1. The stepping of the oscillator 3 is effective to provide a suitable combining signal for each of the frequency components of the input signal to produce a modulator output signal capable of passing through the data filter 4. Thus, each frequency component of the input signal is sequentially mixed with a different oscillator frequency to produce the same heterodyne frequency suitable for passing through the filter 4.

The oscillator frequency signal that is combined with one of the frequency components of the input signal to produce a heterodyne frequency to be passed by the data filter 4 is also combined with all the other frequency components of the input signal. In particular, it is combined with a frequency component that will produce a suitable signal for the data filter 4 in combination with the oscillator frequency derived from the next step of the oscillator 3. In other words, at any point in the stepping operation of the oscillator 3, a first heterodyne frequency is produced, with a first input frequency signal, suitable for passing through the filter 4. In addition, a second heterodyne frequency is produced by a similar combination with another input signal frequency component. This second combination is characterized by comprising an input signal component that will, in the next step of the oscillator operation, produce a heterodyne frequency suitable for passing through the data filter 4. A second frequency filter, labeled a gain sensor filter 12, is arranged to pass this second heterodyne frequency. Accordingly, the output signal from the filter 12 is representative of the future output signal of the data filter 4 on the next step of the oscillator 3. Thus, the signal amplitude of the output signal from the gain sensor filter 12 may be used to provide an anticipation of the future output signal amplitude to be expected from the data filter 4. The output signal from the filter 12 is applied to a gain sensor 14 to detect the average peak amplitude thereof. The gain sensor may be any suitable device for detecting the average peak amplitude of a signal and providing an output signal proportional thereto. The output signals from the data filter 4 and the gain sensor 14 are applied to the switching network 5 for selective distribution to the adjustable attenuators 8, 9, and 10 under control of the programmer 6. A readout device 15 is also connected to the switching network 5 to provide a means for recording and/or utilizing the output signal from the data filter 4 and other desired signals from the above described apparatus.

In operation, the present invention is effective to automatically control the operation of the dual adjustable attenuators 8, 9, and 10 (each attenuator having two separate attenuator adjustments) to provide a fixed range of output signals to the readout device 15. The output signal from the modulator 1 including heterodyne frequencies suitable for passing through the data filter 4 and the gain sensor filter 12 is applied to the filters 4 and 12. As previously mentioned, the frequency signal passed by the gain sensor filter 12 is a heterodyne combination with an input frequency that will produce a compatible frequency signal for the data filter 4 during the next step of the oscillator 3. Accordingly, the output signal from the filter 12 is representative of the signal amplitude to be expected from the filter 4 when the oscillator 3 is stepped to its next frequency output. The output signal from the filter 12 is applied to the gain sensor 14 to detect the peak amplitude thereof. This detection operation is effective to produce an output signal from the sensor 14 representative of the amplitude of the output signal from the filter 12.

The switching network 5 is arranged to provide a signal path from the gain sensor 14 to one of the adjustable attenuators 8, 9, and 10; e.g., attenuator 8. The signal from the gain sensor 14 is arranged to affect the attenuator 8 to produce a signal attenuating effect suitable to maintain an output signal to the readout device 15 within a predetermined amplitude range. The programmer 6 continues the further operation of the present invention by energizing the switching network 5 to a new arrangement. This arrangement of the network 5 is effective to step the oscillator 3 to provide a new oscillator frequency signal for mixing with the input signal. The mixing of the new oscillator frequency signal is effective to produce a heterodyne frequency compatible with the data filter 4 in combination with the frequency component of the input signal that had previously produced a heterodyne frequency suitable for passing through the filter 12. The output signal from the data filter 4 is applied through the network 5 to the attenuator 8 which was preset by the gain sensor 14. The attenuated output signal from the attenuator 8 is connected through the network 5 to the readout device 15.

The new frequency signal from the oscillator 3 is also effective ot produce a heterodyne signal with another frequency component of the input signal suitable for passing through the filter 12. The amplitude of this heterodyne signal is sensed by the sensor 14 to produce a new control signal for adjusting an attenuator. This new control signal is connected by the network 5 to a second attenuator 9 to adjust its attenuating operation.

The next operation sequence by the programmer 6 is effective to step the oscillator 3 to a new frequency, to connect the data filter to the second attenuator 9, and to connect the third attenuator 10 to the gain sensor 14. Additionally, the first attenuator 8 may be connected to the readout device 15 to have its attenuation setting recorded for later use; e.g., a reconstitution of the full amplitude of the input signal frequency component, and to have the attenuator 8 reset to a minimum attenuation setting. The input signal component now passed by the filter 4 is attenuated by the preset attenuator 9 and is applied to the readout device 15. Concurrently, the third attenuator 10 is preset by the gain sensor 14 to an attenuation setting suitable for the next frequency component of the input signal to be analyzed.

The further operation of the programmer 6 comprises stepping the oscillator 3, connecting the filter 4 to the third attenuator 10, and the second attenuator 9 to the readout device 15 and connecting the reset attenuator 8 to the gain sensor 14 for readjustment for the next frequency component. Thus, the attenuators 8, 9, and 10 are sequentially cycled among the positions of gain preset, data readout and gain restore-reset. The presetting of the attenuators 8, 9, and 10 by the sensor 14 is effective to provide a fixed range of output signals to the readout device 15 to provide an accurate recording of the frequency components of the input signal. It is to be noted that the source of the input signals applied to the terminal 2 may be a record reproducing device; e.g., an endless loop magnetic tape transport. The operation of the programmer 6 with the aforesaid type of input signal source would be to step the apparatus of the present step at the end of a complete pass of the tape loop. Thus, the analyzer would extract the amplitude information of one frequency component from the entire record before the next frequency component was analyzed. In such a mode of operation, the previously described switching operation of the network 5 and the oscillator 3 could be arranged to be executed during a blank or spliced portion of the recording medium.

Figure 2:
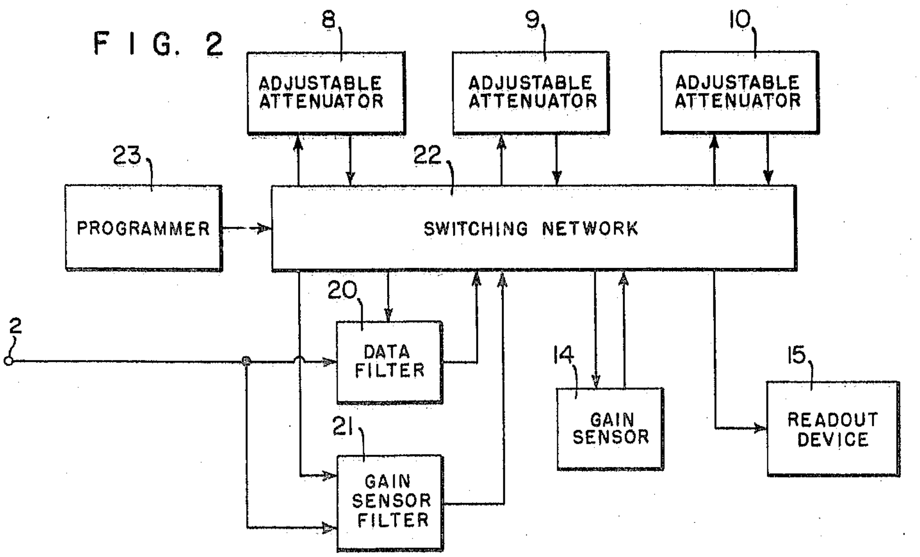
FIG. 2 is a block diagram of a frequency analyzer having a somewhat different structure from that shown in FIG. 1 and also embodying the present invention.

The embodiment of the present invention shown in FIG. 2 has a somewhat different structure from that shown in FIG. 1. The input terminal 2 is connected directly to a data filter 20 and a gain sensor filter 21. The filter 20 and filter 21 are each a plurality of separate frequency filter elements each arranged to pass one of the frequency components of the input signal along respective output lines. The two filters 20 and 21 are offset one band width from each other; i.e., they pass adjacent frequency components of the input signal. The filter 20 is connected by an output line from each element to a switching network 22. Similarly, each element of the filter 21 is connected by a corresponding output line to the network 22.

The switching network 22 is controlled by a programmer 23 to selectively connect the output lines from the filter 20 to the attenuators 8, 9, and 10, the output lines from the filter 21 to the gain sensor 14 and the output signals from the attenuators 8, 9, and 10 to the readout device 15. The elements of the filters 20 and 21 are connected in pairs by the switching network 22. Specifically, an element of the filter 20 is connected to an attenuator and an element of the filter 21 is connected to the gain sensor 14. The amplitude of the frequency signal passed by the element of filter 21 is used, as previously discussed with regard to FIG. 1, to produce a control signal from the gain sensor 14. This control signal is used to set up one of the attenuators 8, 9, and 10; e.g., attenuator 8. The subsequent operation of the network 22 is effective to connect an element of the filter 20 passing a frequency signal which was passed by the previously connected element of the filter 21 to the attenuator 8. The output of the attenuator 8 is connected to the readout device 15. An element of the filter 21 passing a new frequency signal is connected to the sensor 14 to adjust a second attenuator 9. The further operation of the structure shown in FIG. 2 is similar to that shown in FIG. 1 with the exception that instead of stepping the frequency of an oscillator, a new pair of filter elements are selected for connection to the attenuators 8, 9, and 10 and the gain sensor 14. Thus, the attenuators 8, 9, and 10 are cycled among the operations of preset, readout, and gain restore-reset. The two filter elements selected by switching network 22 are selected to pass a pair of frequency signals which are sequentially exchanged. In other words, the frequency signal passed by a selected filter element of the filter 21 in one step of the operation will be passed by the selected filter element of the filter 20 in the next step of operation, and the selected element of the filter 21 will, in the aforesaid next step, pass a new frequency signal. Thus, the frequency signal to be readout is figuratively passed on from the filter 21 to the filter 20.

Accordingly, it may be seen that there has been provided, in accordance with the present invention, a frequency analyzer having automatic gain adjustment means to maintain the output signal from the analyzer in a predetermined amplitude range.

What is claimed is:

1. A frequency analyzer comprising frequency fiilter means operative to separate the frequency components of a composite input signal to be analyzed to produce at least two separate frequency component output signals representative of adjacent frequency components, average peak amplitude detecting means operative to produce an output signal proportional to a detected amplitude of an input signal applied thereto, circuit means connecting one of the separated frequency component output signals as an input signal for said detecting means, a selectively operable switching network, a plurality of adjustable signal attenuating means responsive to the output signal from said detecting means to proportionally adjust the signal attenuation characteristic of said attenuating means, signal readout means, and circuit means connecting said switching network between said attenuating means and said detecting means, said readout means and the other one of said frequency component output signals, said switching network selectively connecting said other one of the separated frequency components as an input signal to one of said attenuating means and the output signal from said last-mentioned attenuating means to said signal readout means and the output signal from said detecting means to another one of said attenuating means and sequentially transferring the attenuating means from said detecting means to connect one of said frequency components to said readout means and connecting another attenuating means to said detecting means.

2. A frequency analyzer comprising an input terminal suitable for connection to a source of a composite input signal to be analyzed, a heterodyne modulating means connected to said input terminal, a stepped oscillator means connected to said modulator means and operative to produce a succession of different frequency output signals, a first frequency filter means operative to pass a first frequency, a second frequency filter means operative to pass a second frequency, said first and said second frequencies corresponding to two heterodyne output frequencies from said modulator means representative of two adjacent frequency components of the composite input signal, circuit means connecting an output signal from said heterodyne modulator as an input signal to said first filter means and said second filter means, average peak amplitude detecting means connected to an output signal from said second filter means and operative to produce an output signal proportional to a detected amplitude of an input signal applied thereto, a selectively operable switching network, programming means connected to said network and operative to energize said network to control the connections established by said network, a plurality of adjustable signal attenuating means, each of said attenuating means being responsive to the output signal from said detecting means to proportionally adjust the signal attenuation characteristic of said attenuating means, a signal readout means, and circuit means connecting said switching network between said attenuating means and said detecting means, said readout means and an output signal from said first filter means said programmer energizing said network to connect said detecting means to one of said attenuating means and an output signal from said first filter means to another of said attenuating means, while connecting an output signal from said last-mentioned attenuating means to said readout means, said programmer sequentially stepping said network switching means in synchronism with said oscillator means to produce a new frequency output signal whereby the two frequencies passed by said first and said second filter means comprise the prior second frequency component of the input signal and a new adjacent frequency component of the input signal, and transferring the attenuating means previously connected to said average peak detecting means to said first filter means and connecting a new attenuating means to said detecting means.

3. A frequency analyzer comprising an input terminal suitable for connection to a source of a complex input signal, a plurality of frequency filters each passing a different frequency signal and having said input terminal connected in common to the input circuits of said filters, average peak amplitude detecting means operative to produce an output signal proportional to a detected amplitude of an input signal applied thereto, a selectively operable switching network, programming means connected to said network and operative to energize said network whereby to control the connections established by said network, a plurality of adjustable signal attenuating means, each of said attenuating means being responsive to the output signal from said detecting means to proportionally adjust the signal attenuation characteristic of said attenuating means, a signal readout means and circuit means connecting said switching network between said attenuating means and said filters, said detecting means and said readout means, said programmer being arranged to energize said network whereby to selectively connect an output signal from one of said filter means to said detecting means and an output signal from said detecting means to a first one of said attenuating means while connecting an output signal from another one of said filter means to said readout means through a second attenuating means and to successively transfer said first attenuating means and said one of said filter means to replace said second attenuating means and said another one of said filter means and to connect a new one of said filter means and a new one of said attenuating means to said detecting means to produce an adjustment of said new one of said attenuating means.

4. A frequency analyzer as set forth in claim 3 wherein each of said attenuating means includes means for resetting said attenuating means to a zero signal attenuating level after said attenuating means is replaced with said new one of said attenuating means by said switching network from the connection with said readout means.

5. A signal analyzer comprising detecting means operative to detect a characteristic of an input signal and to produce a control signal in response thereto, a plurality of signal modifying devices each operative to vary a signal modifying operation in response to said control signal, input signal means arranged to provide a first output signal representative of the present condition of an input signal to be analyzed and a second output signal representative of an anticipated condition of said input signal to be analyzed, means connecting said second output signal as an input signal to said detecting means, a signal output means, a sequentially actuated switching network, and circuit means connecting said switching network between said modifying devices and said detecting means, said input signal means and said output means, said switching means being arranged to sequentially transfer a control signal from said detecting means from a first one of said signal modifying means to a second one of said modifying means and to apply said first output signal to said output means through said first modifying means.

References Cited by the Examiner

UNITED STATES PATENTS

| | | | |
|---|---|---|---|
| 3,076,932 | 2/1963 | Jaffe | 324—77 |
| 3,102,165 | 8/1963 | Clapper | 324—77 X |
| 3,129,287 | 4/1964 | Bakis | 324—77 X |

WALTER L. CARLSON, *Primary Examiner.*

A. E. RICHMOND, *Assistant Examiner.*